United States Patent
van Oldenborgh et al.

(10) Patent No.: US 7,529,190 B2
(45) Date of Patent: *May 5, 2009

(54) METHOD, DEVICE AND SOFTWARE FOR DIGITAL INVERSE MULTIPLEXING

(75) Inventors: Marc van Oldenborgh, Amsterdam (NL); Martijn Gnirrep, Amsterdam (NL)

(73) Assignee: Nonend Inventions N.V., Curacao (NL)

( * ) Notice: Subject to any disclaimer, the term of this patent is extended or adjusted under 35 U.S.C. 154(b) by 749 days.

This patent is subject to a terminal disclaimer.

(21) Appl. No.: 10/837,546

(22) Filed: Apr. 29, 2004

(65) Prior Publication Data

US 2004/0202115 A1  Oct. 14, 2004

Related U.S. Application Data

(63) Continuation of application No. 10/085,225, filed on Feb. 27, 2002, now Pat. No. 6,751,237.

(30) Foreign Application Priority Data

Jul. 4, 2001 (NL) ..................................... 1018463

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04J 3/24* (2006.01)
- *H04L 1/00* (2006.01)
- *H04L 12/26* (2006.01)
- *H04L 12/54* (2006.01)

(52) U.S. Cl. ..................... 370/235; 370/428; 370/474

(58) Field of Classification Search ................. 370/235, 370/299, 310, 389, 394, 412, 428, 463, 473, 370/474, 535, 537, 218, 236.2, 262, 270, 370/363, 395.7

See application file for complete search history.

(56) References Cited

U.S. PATENT DOCUMENTS 5,293,378 A  3/1994  Shimizu (Continued)

FOREIGN PATENT DOCUMENTS

EP  614 323 A1  9/1994

(Continued)

OTHER PUBLICATIONS

IEEE Internation Conference on Communications, Jun. 16-18, 1975, pp. 41-10-41-13, New York, pp. 41-10.

(Continued)

*Primary Examiner*—Seema S. Rao
*Assistant Examiner*—Leon Andrews
(74) *Attorney, Agent, or Firm*—Finnegan, Henderson, Farabow, Garrett & Dunner, LLP

(57) ABSTRACT

A packet of digital data is split into a first flow wherein the packet of digital data is sent from front to rear a second flow wherein the packet of digital data is sent from rear to front, and a third flow, consisting of a flow of data elements obtained from each time a first data element of the digital data from the rear part of the front subarea of the packet and a second data element of the digital data from the front part of the rear subarea of the packet that are reduced into one third data element by means of a reversible operation. Applications includes cordless telephones, computer networks, such among others the internet, and other networks of devices in which digital data are exchanged.

29 Claims, 9 Drawing Sheets

U.S. PATENT DOCUMENTS

| | | | |
|---|---|---|---|
| 5,570,356 A | | 10/1996 | Finney et al. |
| 5,617,417 A | * | 4/1997 | Sathe et al. .................. 370/394 |
| 5,668,923 A | | 9/1997 | Siwiak et al. |
| 5,819,117 A | | 10/1998 | Hansen |
| 5,867,500 A | | 2/1999 | Dolman et al. |
| 5,875,192 A | * | 2/1999 | Cam et al. ............... 370/395.7 |
| 5,948,099 A | | 9/1999 | Crawford et al. |
| 6,078,565 A | | 6/2000 | Ben-Michael et al. |
| 6,134,246 A | * | 10/2000 | Cai et al. .................... 370/474 |
| 6,160,808 A | | 12/2000 | Maurya |
| 6,198,749 B1 | | 3/2001 | Hui et al. |
| 6,205,142 B1 | | 3/2001 | Vallee |
| 6,275,503 B1 | | 8/2001 | Driscoll |
| 6,339,756 B1 | * | 1/2002 | Hinderks .................... 704/201 |
| 6,360,054 B1 | | 3/2002 | Nakano et al. |
| 6,415,398 B1 | * | 7/2002 | Kikuchi et al. .............. 714/701 |
| 6,775,305 B1 | | 8/2004 | Delvaux |
| 6,876,669 B2 | | 4/2005 | Shalom |
| 2002/0136188 A1 | | 9/2002 | Kim |
| 2002/0150065 A1 | | 10/2002 | Ponnekanti |
| 2002/0154637 A1 | * | 10/2002 | Keller-Tuberg ............. 370/394 |

FOREIGN PATENT DOCUMENTS

| | | |
|---|---|---|
| EP | 910 195 A2 | 4/1999 |
| EP | 614 323 B1 | 11/1999 |
| EP | 1 024 632 A2 | 8/2000 |
| EP | 1 039 693 A2 | 9/2000 |
| EP | 1 047 239 A2 | 10/2000 |
| EP | 1 091 530 A2 | 4/2001 |
| JP | 03-042940 | 2/1991 |
| JP | 9-64913 | 3/1997 |
| JP | 11-225161 | 8/1999 |
| JP | 2000-307650 | 11/2000 |
| WO | WO 96/27248 | 9/1996 |
| WO | WO 00/16569 | 3/2000 |
| WO | WO 02/084933 A2 | 10/2002 |
| WO | WO 03/005661 A1 | 1/2003 |

OTHER PUBLICATIONS

IEEE Transactions on Commications, vol. 41, No. 11, Nov. 1993, pp. 1677-1686.

EEE International Workshop on Network and Operating Systems Support for Digital Audio and Video, pp. 13-23.

IEEE INFOCOM 2000, Nineteenth Annual Joint Conference on the IEEE Computer and Communications Societies, "Parallel-access for mirror sites in the Internet," by Rodriguez, P. et al., vol. 2, pp. 864-873, Tel Aviv, Israel, Mar. 2000.

Stallings, William. "Data Computer Communications" Prentice Hall. 1997, pp. 158-164.

Duncanson, Jay, "Inverse Multiplexing" IEEE Communications Magazine. Apr. 1994. pp. 34-41.

* cited by examiner

METHOD, DEVICE AND SOFTWARE FOR DIGITAL INVERSE MULTIPLEXING

The present patent application is a Continuation of application Ser. No. 10/085,225, filed Feb. 27, 2002 now U.S. Pat. No. 6,751,237.

FIELD OF THE INVENTION

The invention relates to a method, a device and software for digital inverse multiplexing digital data.

BACKGROUND OF THE INVENTION

In practice very many methods are know to send digital data, particularly digital data through a network. An example are digital data that are sent through the internet, but also digital telephone signals, such as for instance in case of cordless GSM telephones.

In practice also various methods and devices are known for inverse multiplexing digital data.

The data are sent in the form. of data packets via a medium. This can take place via a physical cabling in for instance copper or glass fibre, or cordless, for instance via infrared or radio waves.

Because the capacity of data transfer, often coupled to bandwidth, of the media over which the data are sent is mostly too small, the data are often compacted. However, this has often appeared not to be sufficient.

Additionally many of these methods are aimed at optimising the data transfer between two computers. Moreover, many techniques require an overhead, and are not always as robust regarding the errors or failures of lines and other malfunctions.

SUMMARY OF THE INVENTION

It is among others an object of the present invention to at least partially solve these problems. To that end the invention provides a method for digital inverse multiplexing digital data, wherein a packet of digital data is split into:
  a first flow wherein the packet of digital data is sent from front to rear;
  a second flow wherein the packet of digital data is sent from rear to front, and;
  a third flow, consisting of a flow of data elements obtained from each time a first data element of the packet of digital data from the rear part of the front subarea of the packet and a second data element of the packet of digital data from the front part of the rear subarea of the packet that are reduced into one third data element by means of a reversible operation.

Additionally the invention provides a device for sending a packet of digital data consisting of data elements, comprising:
  a transmission module, adapted for transmitting the data elements;
  a memory module, adapted for storage of the packet of digital data;
  a reading module, adapted for reading each time two data elements from two parts of the memory module, one data element from the rear part of the front subarea of the packet, and one data element from the front part of the rear subarea of the packet;
  an operator, adapted for converting said two data elements into one data element to be transmitted, and
  a construction module, adapted for receiving the data elements of the reading module, supplying the data elements to the operator, and receiving the resulting data element from the operator and supplying the data element to the transmission module.

Additionally the invention provides a device for receiving a packet of digital data consisting of data elements, comprising:
  a receiving module, adapted for receiving at least three flows of data elements;
  a memory module, adapted for storage of the data elements;
  an operator, adapted for converting two data elements in one data element;
  a counting module, adapted for tallying the quantity of data elements that have been received from each flow;
  a decision module, adapted for determining whether all data elements that are necessary for reconstructing the complete packet of digital data are present and to determine which part of the packet has to be determined by means of reconstruction, and
  a reconstruction module for retrieving each time two data elements from the memory means, which is connected to the operator for supplying said data elements to the operator, discharging the resulting data element of the operator and writing the resulting data element to the memory module.

Additionally the invention provides software for receiving a packet of digital data that is sent in at least three flows of data elements, comprising:
  a writing routine for writing the data elements of the flows of data elements to the memory means;
  a counting module for tallying the quantity of data elements that have been received from each flow;
  a decision routine for determining whether all data elements that are necessary for reconstructing the complete packet of digital data are present and to determine which part of the packet has to be determined by means of reconstruction;
  an operator routine for converting two data elements into one data element, and
  a reconstruction routine for retrieving each time two data elements from the memory means, for supplying said data elements to the operator routine, for discharging the resulting data element from the operator routine and writing the resulting data element to the memory means.

By splitting the data flow in several flows, wherein a first flow starts sending the data from the front and works its way to the rear, the second flow works from the rear to the front, and at least one third flow according to the invention is defined, the possibility is given to very quickly send data between and to for instance computers. Additionally, because of the specific way in which the flows are compiled it is not necessary to let others than the transmitter(s) and receivers communicate with each other. Possible different transmitters do need not communicate with each other. Additionally no complex data processing is necessary to for instance tally when all data have been received.

Moreover, it is possible as a result of the invention to realise a fast and robust data transfer of a low overhead, also because a third check signal is compiled from the data.

In many cases the data connection is a-symmetrical: the transfer capacity is smaller than the receiving capacity. In the method according to the invention, the entire receiving capacity can be used despite the smaller transmission capacity. This may for instance be of importance in so-called streaming broadcasts through the internet, wherein through the internet digital radio broadcasts and in the future even television or video can take place. The data flows can also enter via various lines. For instance one data flow can for example enter via a telephone line, and another data flow via a cable, the electricity grit or cordless via GSM. It is also possible to let the data flows enter via one cable by means of physical multiplexing. The invention therefore actually offers a specific form of digital inverse multiplexing.

Inverse multiplexing according to the invention can take place at different levels, at micro level and at macro level, or simultaneously at different levels. A possible micro level is bit level. A possible macro level is the level of data packets that are merged into data at receipt, as known from connections that run via the internet.

In an embodiment of the method consecutive first data elements from the rear part of the front subarea are selected from rear to front. As a result even less overhead and control is necessary. In an embodiment thereof or of the method according to the invention consecutive second data elements from the front part of the rear subarea are selected from front to rear, which once more considerably simplifies the control. In an embodiment each time an immediately following data element is selected.

In one of the preceding methods the packet of digital data, if necessary supplemented to a packet that can be split into two equal parts, can be split into two equal sized parts. As a result fewer positions have to be tallied, and a simple method can be guaranteed.

In one of the preceding methods the first and second data elements are bits of the packet of digital data, and the third data element is the result of a single binary operation, preferably an XOR operation, on the first data element and the second data element. By means of a simple, reversible binary operation a quick and simple method can be realised.

In a embodiment according to any one of the preceding methods, the data elements of the first, second and third flow, respectively, are placed in a first, second and third data buffer, respectively. Thus the data buffers can have the size of half the packet of digital data. In this way a simple method can be realised with minimal memory means and control.

In another embodiment of the method the data elements of the first, second and third flow, respectively, are placed in one data buffer having the size of the packet of digital data. In this way optimal use is made of memory means available. In said embodiment the first flow can fill the data buffer from front to rear, the second flow can fill the data buffer from rear to front, and the third flow is duplicated, wherein one duplicated flow fills the data buffer from the middle to the front, and the other duplicated flow fills the data buffer from the middle to the rear. As a result very simple implementation is possible.

In another embodiment the data elements of the first and second flow are placed in a first data buffer, wherein the first flow fills the data buffer from front to rear, and the second flow fills the data buffer from rear to front, and the data elements of the third flow are placed in a second data buffer. This is for instance advantageous when the first or second flow are very fast. It is simply possible then to let that flow run beyond the half.

In an embodiment of a method as described above, either the first or the second flow can overwrite data elements already present in the data buffer originating from the third flow.

In an embodiment of the method a first, second or third device, respectively, sends the first, second and third flow, respectively, to a fourth device. The fourth device can send a signal to the first, second and third device when either the data buffer is full or the respective data buffers are full, or stops sending receipt confirmations as soon as the data buffer is full or the respective data buffers are full.

In a possible embodiment, for instance when transmitting or receiving streaming internet content or other sequential signals, the flows are almost simultaneously sent.

An embodiment of the method described above relates to a method wherein a transmitting device sends the first, second and third flow to a first, second and third receiving device, respectively, and wherein the first, second and third receiving device forward their respective flows to the other two receiving devices.

Additionally the invention relates to a method for sending a packet of digital data to a first device in an organic data network, wherein at least two transmitting devices in the data network simultaneously send complementary data packets to the first device and a third transmitting data device sends data packets to the first device that have been obtained from each time a first data element from the rear part of the front subarea of the packet and the second data element from the front part of the rear subarea of the packet which by means of a reversible operation have been reduced into one third data element, wherein the data packets of the transmitting devices form the packet when merged.

In an embodiment of this method the first device controls the transmission of the transmitting devices, and the first device forwards the data packet to at least one device in the data network, independent of the transmitting device or devices. As a result the method, the software or the device can be deployed in an organic network as described in Dutch patent 1017388.

Additionally the invention relates to a method for receiving a packet of digital data, wherein a receiving device provided with data storage means creates a data buffer in the data storage means the size of a packet of digital data to be received, and after that almost simultaneously receives a first flow, a second flow, and at least one third flow of data elements, wherein the receiving device fills the data buffer from front to rear with the first flow of data elements and fills the data buffer from rear to front with the second flow of data elements, and fills the data buffer from the middle to the front and to the rear with the third flow of data elements.

In an embodiment of this method the receiving device makes it known to transmitting devices of the flows of data elements when the front or rear half of the data buffer is full and the quantity of data of the third flow and the flow that does not fill the data buffer halfway yet together are sufficient to fill the other half of the data buffer.

Additionally the invention relates to a method for sending a packet of digital data, wherein a device provided with data storage means creates a data buffer in the data storage means, stores the packet of digital data in the data buffer, converts each time a first data element from the rear part of the front subarea of the data buffer and a second data element from the front part of the rear subarea of the data buffer into one data element by means of a reversible operation, and transmits said data element.

In an embodiment of one of the methods described above for either receiving or sending a packet of digital data at least three flows of digital data are almost simultaneously received or sent, respectively.

A device for receiving according to the invention can furthermore comprise a duplicating module, adapted for duplicating a data element and writing each of the duplicated data elements to the memory module.

Additionally the invention relates to software for sending a packet of digital data according to a method described above, wherein the software is provided with:

a construction routine for retrieving two data elements from the memory means, one data element from the rear part of the front subarea of the packet, and one data element from the front part of the rear subarea of the packet, and converting said two data elements into one data element by means of a reversible operation;

a transmission routine for transmitting the wanted flow of data elements, and a stop routine for receiving and processing an instruction from a receiver of a flow of data elements to stop transmitting.

In an embodiment said software further comprises:

an instruction routine for receiving an instruction which of the flows of data elements has to be sent.

According to another embodiment, a method is provided for transmitting digital data, wherein a packet of digital data elements is split into a front sub-packet and a rear sub-packet. The method may include sending the packet starting in at least three flows, including: a first flow wherein the packet of digital data is sent starting from the front end; a second flow wherein the packet of digital data is sent starting from the rear; and, a third flow of third data elements C obtained each time a first data element A from the rear part of the front sub-packet and a second data element B from the front part of the rear sub-packet are reduced into one third data element by using an operation $F(A,B)=C$ which operation F is such that there exist operations G,H for which $G(A,C)=B$ and $H(B,C)=A$.

In accordance with another embodiment, a method is provided for receiving a packet of digital data of data elements 1 thru n, wherein a receiving device is provided with data storage means. The data storage means may include at least a first and a second data buffer. The first data buffer may have the size of the packet of digital data to be received and the second data buffer may have at least half the size of the packet of digital data. The receiving device may receive a first flow of data elements A, a second flow of data elements B, and at least one third flow of data elements C; fill the first data buffer from front to rear with the data elements of the first flow of data elements and rear to front with the data elements of the second flow; fill the second data buffer with the data elements of the third flow of data elements C; and determine the amount of data elements it has received in the first, second and third flow each time it receives a data element. If one of the amount received via the first or second flow equals n/2, the receiving device may take subsequent data elements A or B originating from that flow, and subsequent data elements C originating from the third flow, apply an operation G or H for which $G(A,C)=B$ and $H(B,C)=A$, and fill the first data buffer the resulting data elements. If one of the amount received via the third flow equals n/2, the receiving device may take subsequent data elements C originating from that flow, and subsequent data elements A or B originating from the flow with the second largest amount, apply an operation G or H for which $G(A,C)=B$ and $H(B,C)=A$, and fill the first data buffer the resulting data elements.

Another embodiment relates to a method for receiving a packet of digitat data of data elements 1 thru n, wherein a receiving device is provided with data storage means. The data storage means may include at least a first, second and third data buffer, the data buffers being at least half the size of the packet of digital data to be received. The receiving device may receive a first flow of data elements A, a second flow of data elements B, and at least one third flow of data elements C; fill the first data buffer with the data elements of the first flow of data elements A; fill the second data buffer with the data elements of the second flow of data elements B; fill the third data buffer with the data elements of the third flow of data elements C; and determine when one of the buffers holds n/2 data elements. If the first buffer holds n/2 data elements A, the receiving device may take subsequent data elements A from that buffer and subsequent data elements C originating from the third buffer, apply operation G for which $G(A,C)=B$, and fill the second data buffer with reconstructed data elements B. If the second buffer holds n/2 data elements B, the receiving device may take subsequent data elements B from that buffer and subsequent data elements C originating from the third buffer, apply operation H for which $H(B,C)=A$, and fill the first buffer with reconstructed data elements A. If the third buffer holds n/2 data elements C, the receiving device may take subsequent data elements C from that buffer and subsequent data elements A or B originating from the buffer holding the second largest amount of data elements, apply an operation G or H for which $G(A,C)=B$ and $H(B,C)=A$, and fill the other data buffer with the reconstructed data elements.

Another embodiment relates to a device for sending a packet of digital data consisting of data elements. The device includes a transmission module, adapted for transmitting the data elements; a memory module, adapted for storage of the packet of digital data; a reading module, adapted for reading each time two data elements from two parts of the memory module, one data element from the rear part of the front subarea of the packet, and one data element from the front part of the rear subarea of the packet; an operator, adapted for converting the two data elements, A and B, into one third data element C to be transmitted, the operator performing an operation $F(A,B)=C$, which operation F is such that there exist operations G, H for which $G(A,C)=B$ and $H(B,C)=A$; and a construction module, adapted for receiving the data elements of the reading module, supplying the data elements to the operator, and receiving the resulting data element from the operator and supplying the data element to the transmission module.

In another embodiment, a device is provided for receiving a packet of digital data consisting of data elements. The device includes a receiving module, adapted for receiving at least three flows of data elements; a memory module, adapted for storage of the data elements; an operator, adapted for converting two data elements A and B in one data element C, the operator performing an operation $F(A,B)=C$, which operation F is such that there exist operations G, H for which $G(A,C)=B$ and $H(B,C)=A$; a counting module, adapted for tallying the quantity of data elements that have been received from each flow; a decision module, adapted for determining whether all data elements that are necessary for reconstructing the complete packet of digital data are present and to determine which part of the packet has to be determined by reconstruction; and a reconstruction module for retrieving each time two data elements A and B from the memory, one of the data elements originating from one of the flows and the other data elements originating from one of the other flows, which reconstruction module is connected to the operator for supplying said data elements A and B to the operator, discharging the resulting data element C of the operator and writing the resulting data element C to the memory module.

Another embodiment relates to an apparatus comprising a machine-readable medium containing instructions which, when executed by a machine, cause the machine to perform a set of operations. The operations include splitting a packet of digital data elements into a front sub-packet and a rear sub-packet; sending at least three flows including a first flow wherein the packet of digital data is sent starting from the front end; a second flow wherein the packet of digital data is sent starting from the rear end; and, a third flow of third data elements C obtained each time a first data element A from the rear part of the front sub-packet and a second data element B from the front part of the rear sub-packet are reduced into one third data element by using an operation F(A,B)=C which operation F is such that there exist operations G,H for which G(A,C)=B and H(B,C)=A; sending from a transmitting device the first, second and third flow to a first, second and third receiving device, respectively, and wherein the first, second and third receiving device forward their respective flows to the other two receiving devices; retrieving two data elements from the memory, one data element from the rear part of the front subarea of the packet, and one data element from the front part of the rear subarea of the packet; converting the two data elements into one data element by using the operation F(A,B); transmitting a wanted flow of data elements; and receiving and processing an instruction from a receiver of a flow of data elements to stop transmitting.

Another embodiment relates to an apparatus comprising a machine-readable medium containing instructions which, when executed by a machine, cause the machine to perform operations. The operations include: receiving a packet of digital data that is arranged in at least three flows of data elements; writing the data elements of the flows of data elements to the memory; tallying the quantity of data elements that have been received from each flow; determining whether all data elements that are necessary for reconstructing the complete packet of digital data are present and to determine which part of the packet has to be determined by reconstruction; converting two data elements into one data element by using an operation F(A,B)=C which operation F is such that there exist operations G, H for which G(A,C)=B and H(B,C)=A; retrieving each time two data elements from the memory, for supplying the data elements to the operator routine, for discharging the resulting data element from the operator routine; and writing the resulting data element to the memory.

Preferably a device stops sending after receipt of a signal from the receiving device. As a result the coordination is again simple.

Additionally the invention relates to software provided with routines for carrying out the method according to one or more of the preceding claims. From the above description, in combination with the figures and their description, it will immediately be obvious to the expert which routines are necessary to that end, and how said routines have to work with respect to each other. Such software can of course be immediately implemented in hardware, for instance in a PROM, EPROM or the like, or entered into hardware, for instance at chip level in hardware logic.

Additionally the invention relates to a carrier provided with software as described.

Additionally the invention relates to a device, provided with software as described.

The invention is further elucidated on the basis of the figures that form exemplary embodiments of the invention. However, the invention is not limited to said exemplary embodiments.

DESCRIPTION OF EMBODIMENTS

Figure 1:
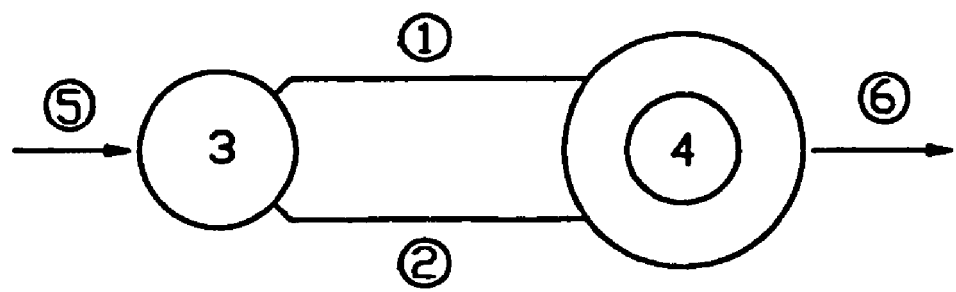
FIG. 1 the splitting of one signal into two signals and merging at the receiver, as described in Dutch patent 1017870.

FIG. 1 shows a situation as has also been described in Dutch patent 1017870, wherein a signal 5 conventionally enters a receiver 3. Receiver 3 splits the signal, or each data packet of which the signal has been built up, into two flows 1 and 2 to forward it to receiver 4. Flow 1 is the signal, sent from the front, that means the first bit of the data packet or the signal is sent first, then the second, etc. Flow 2 is the signal 5 or a data packet thereof, but then backwards, that means first the last bit is sent, then the penultimate one, etc. Thus there is question of complementary signals with which a complete data packet can be reconstructed.

Receiver 4 fills its data buffer simultaneously from the front with signal 1 and from the rear with signal 2. This can also take place by means of a computer program, but can also be implemented by way of hardware. When the buffer is full, that means the complete signal or data packet has been received, the receiver 4 sends a signal to transmitter/sender 3 that the buffer is full, that means that the signal has been received. It is of course also possible that receiver 4 keeps sending a signal to transmitter/sender 3 until the buffer is full, or just closes down the connection when the buffer is full, or sets a port at high or low.

Figure 2:
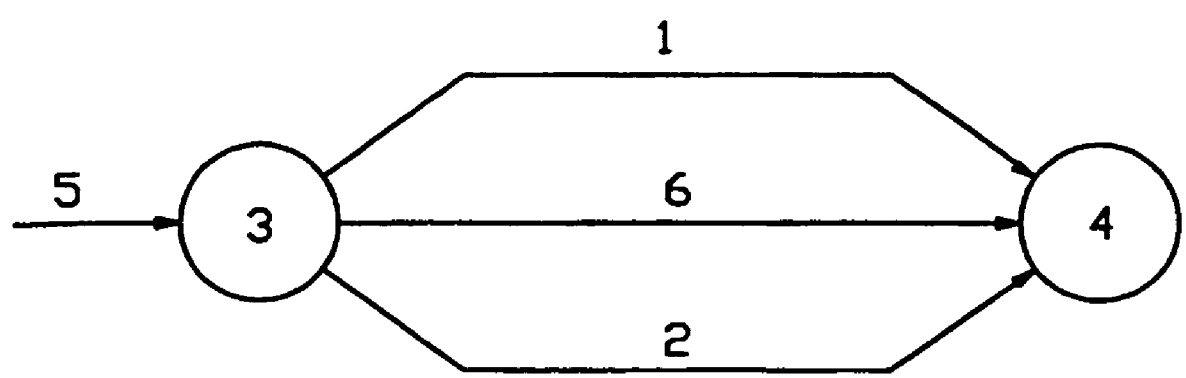
FIG. 2 the splitting of one signal into three signals and merging at the receiver.

In FIG. 2 almost the same situation is described as in FIG. 1, however, a third data flow or signal 6 is present according to the present invention. The complete signal or data packet can be reconstructed here when one of both other signals 1 or 2 has been completely received, that means that one half of the data has been received and the other two flows 1 or 2 together with 6 form the other half of the data or the packet of data. Whether the data of the three flows together are sufficient for reconstructing the packet of digital data, can also be used as criterion. This is further elucidated in among others FIGS. 5A-5D.

Figure 3:
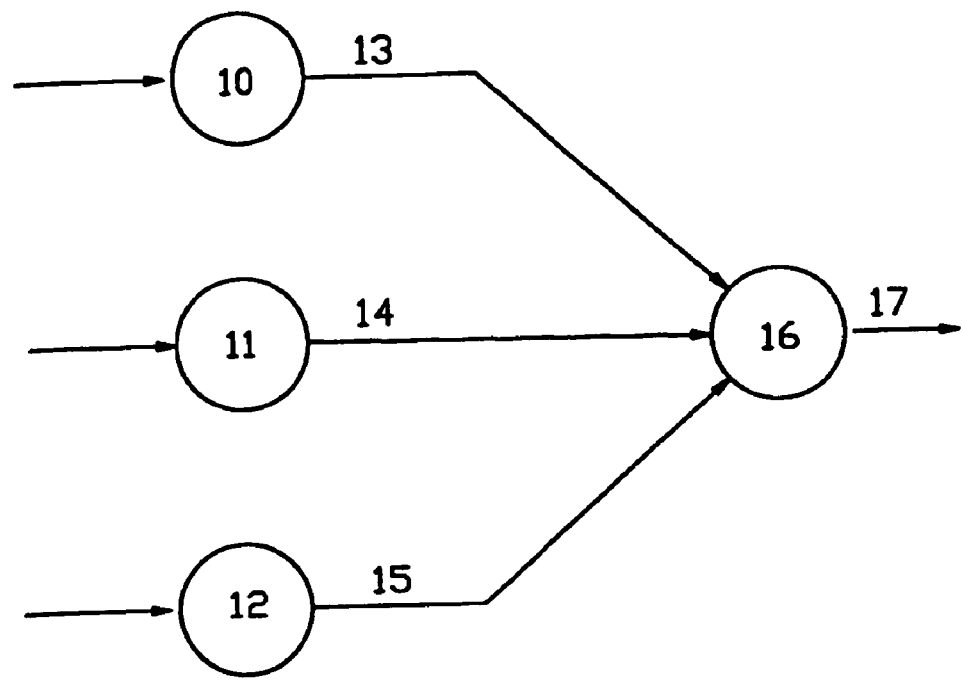
FIG. 3 the receiving of a split signal by a receiver from three physically separated sources, FIG. 4 the splitting of one signal into three flows to three physically separated receivers, that exchange signals one to the other in order to obtain the complete signal.

In FIG. 3 a possible situation is shown in which a first, second and third device (10, 11, 12) send flows of data 13, 14 and 15, respectively, to a fourth device 16. Device 16 reconstructs the original signal or the original data flow, and forwards it as data flow 17. This may for instance be advantageous when the receiving capacity of device 16 is larger or equal to the common transmission capacity of 10, 11 and 12. An even larger advantage is created when the transmission capacity of 16 is larger than the transmission capacity of 10, 11 or 12. After all a flow 17 is thus obtained that has a larger speed than the three separate flows 13, 14 and 15.

Figure 4:
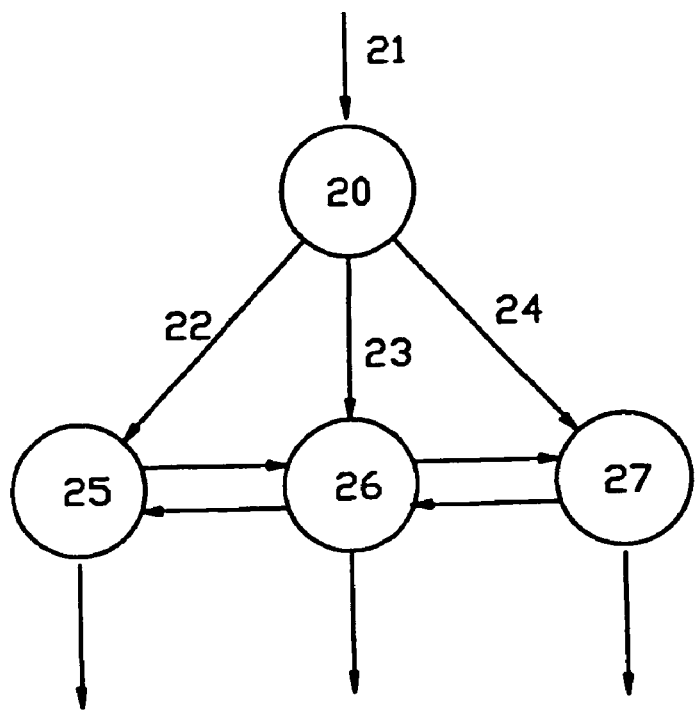

FIG. 4 shows an embodiment wherein a first device 20 receives a data flow 21. Said flow is split in three separate flows 22, 23 and 24 to devices 25, 26 and 27, respectively. Said devices forward their received data to each other. This is possible in various ways. Shown is and option wherein 25 exchanges with 26 and 26 with 27. It is also possible that all three devices 25, 26 and 27 exchange one with the other. The three devices can all three of them forward the data again, as a result of which effectively a transmission capacity is achieved that is three times as large.

FIG. 5A-5D shows an embodiment of the operation of the invention. Here for the sake of ease a situation is shown in which one device 30 sends three flows A, B and C and one device 31 receives three flows A, B and C (as is also the case in FIGS. 6A-C and 7A-B).

The transmitting device 30 is provided with a data buffer 32 provided with n data elements 1 . . . n. Said data elements may for instance be little data packets, bits or bytes. Flow A consists of data elements that are consecutively are retrieved from the data buffer 32 according to the sequence indicated with direction a. Flow C consists of data elements that are consecutively retrieved from the data buffer 32 according to the sequence indicated by direction c. Flow B arises as a result of data elements that are consecutively retrieved from the data buffer according to the sequence indicated by the direction b, and data elements that are retrieved from the data buffer according to the sequence that is indicated by the direction b'. Two data elements in this case are subjected to an XOR operation 33 resulting in one output data element. In this way a flow B is created. In the figure it is indicated that the data elements are retrieved from the middle 34 towards the ends of the data buffer. It is possible in some situations however, that the flow B does not start exactly from the middle. The advantage of the flow B starting exactly in the middle is that no extra data have to be sent or tallied.

Figure 5A:
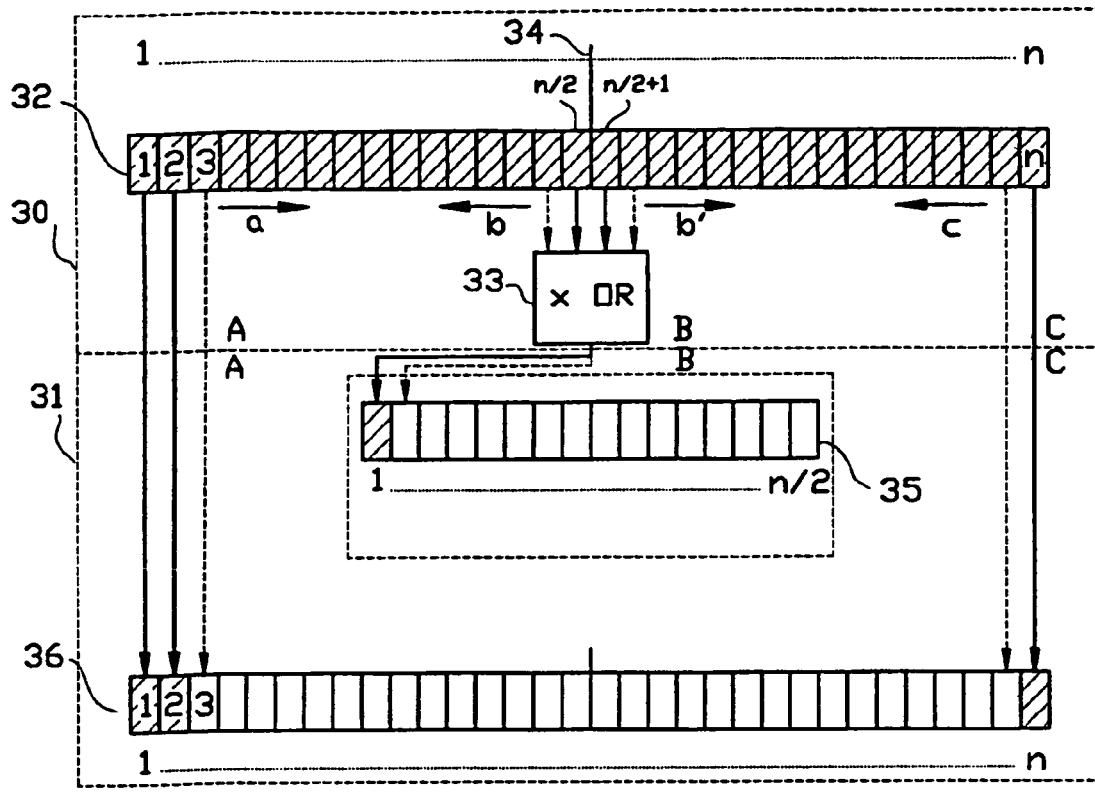
FIG. 5A-5D the sending of a packet of digital data via three flows and the receiving and reconstructing via two data buffers, FIG. 6A-6C the sending of a packet of digital data via three flows and the receiving and reconstructing via two data buffers, FIG. 7A-7B the sending of a packet of digital data via three flows and the receiving and reconstructing via one data buffer, FIG. 8 consecutive steps in filling one data buffer.
Figure 5B:
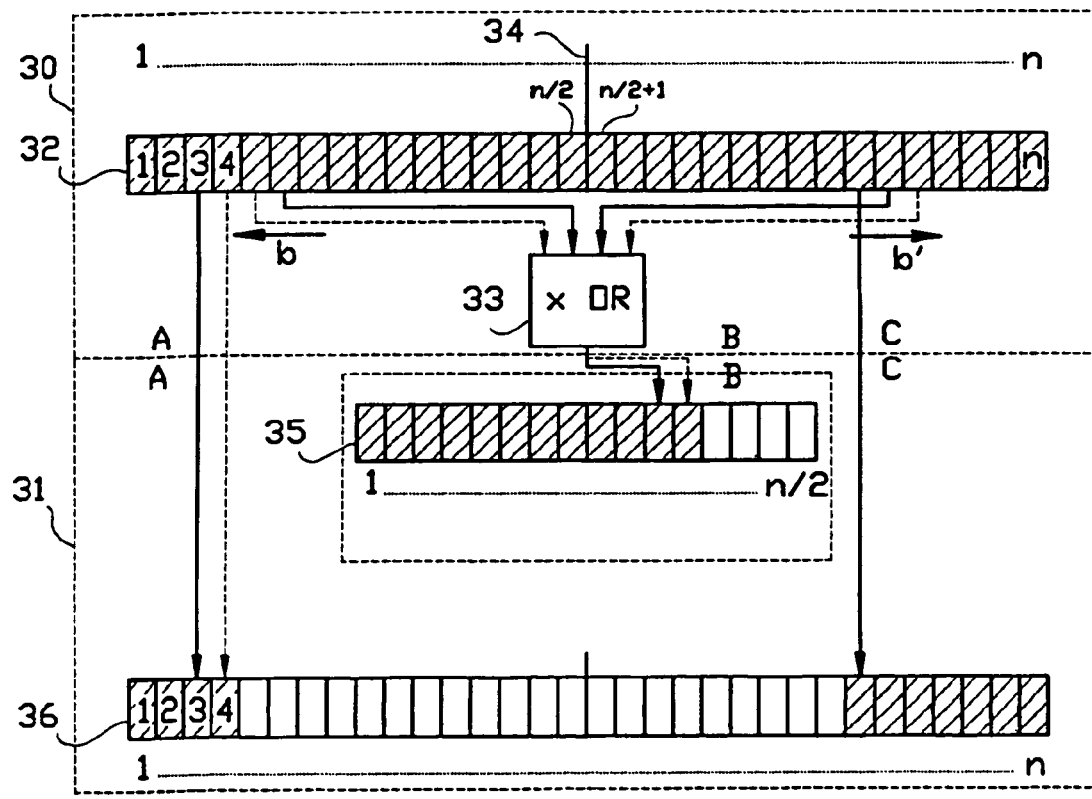

The receiving device in this example comprises two data buffers, data packet buffer 36 that may contain n data elements, and an auxiliary data buffer 35 that may contain n/2 data elements. The incoming flow A fills data packet buffer 36 from front to rear and flow C fills data packet buffer 36 from rear to front. So far the method is the same as the one described in Dutch patent 1017870. The incoming flow B fills the auxiliary data buffer 35 from front to rear. In FIG. 5B said progress is shown. In this example 3 data elements are sent via flow A and number 4 starts (dotted line), 7 data elements are sent via flow C and via flow B 11 data elements and number 12 starts (dotted line).

Figure 5C:
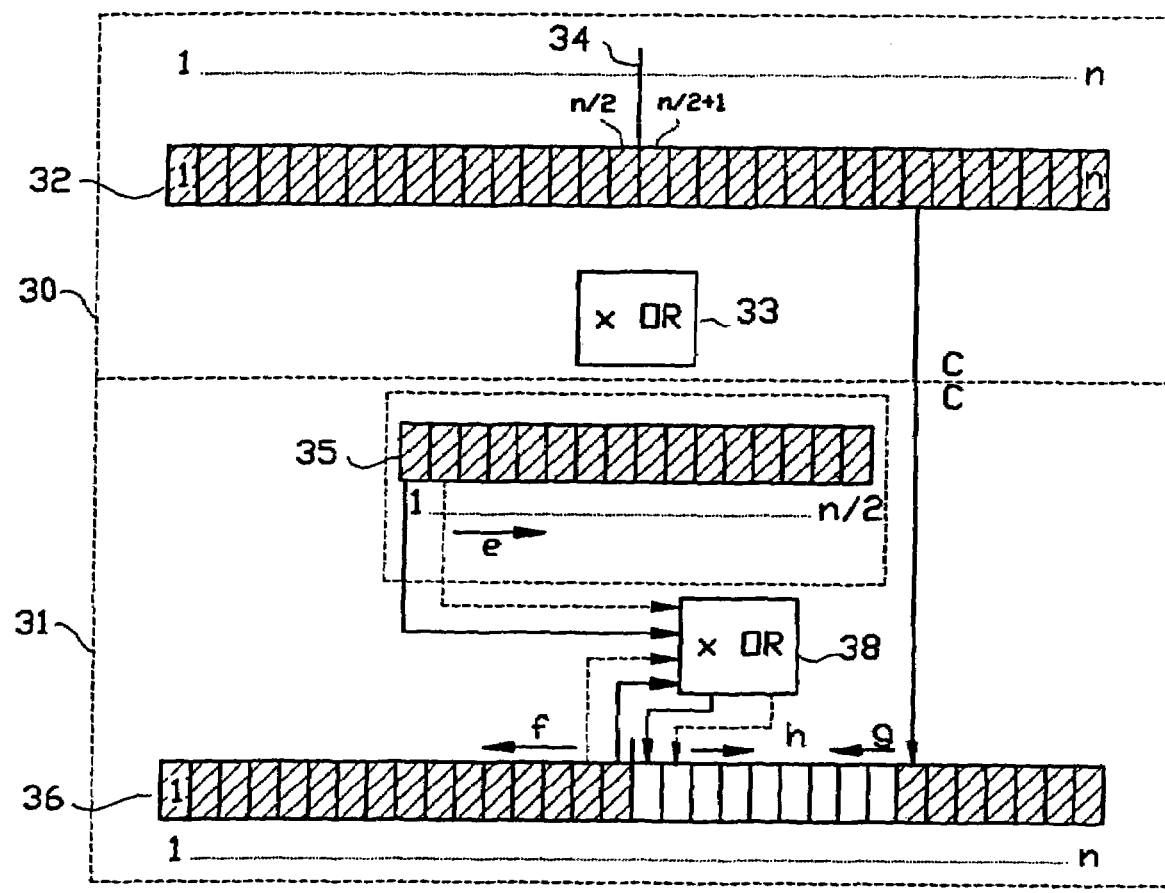

In FIG. 5C it is indicated that flow A has stopped because half of the data elements have been sent. Flow B has also stopped because auxiliary data buffer 35 is full. Meanwhile flow C in this case continues, but said flow might stop now already, because from the front half of the data in data packet buffer 36 and auxiliary data buffer 35 the data from the rear half of the data packet buffer 36 can be reconstructed in the manner as indicated in FIG. 5C. Each time one data element from auxiliary data buffer 35 and one data elements from data packet buffer 36 are converted by means of an XOR operation into one data element corresponding to a data element of the original packet of digital data. In the figure it is indicated that the data elements are processed via the fixed lines, and after that the data elements with the dotted lines. Successively the data elements according to the sequence indicated by arrow e are retrieved one by one from the auxiliary data buffer 35 and supplied to XOR operation device (or XOR operator) 38. In addition each time one data element is simultaneously copied from the middle towards the front according to the direction indicated by arrow f from the data packet buffer 36 and also supplied to XOR operation device 38. The output of the XOR operation device 38 is an original data element of the original packet of data that is placed in the data packet buffer 36, from the middle of the data packet buffer towards the rear, according to the direction indicated by arrow h. As a result the complete data packet buffer 36 is filled and the original packet of data is reconstructed.

Figure 5D:
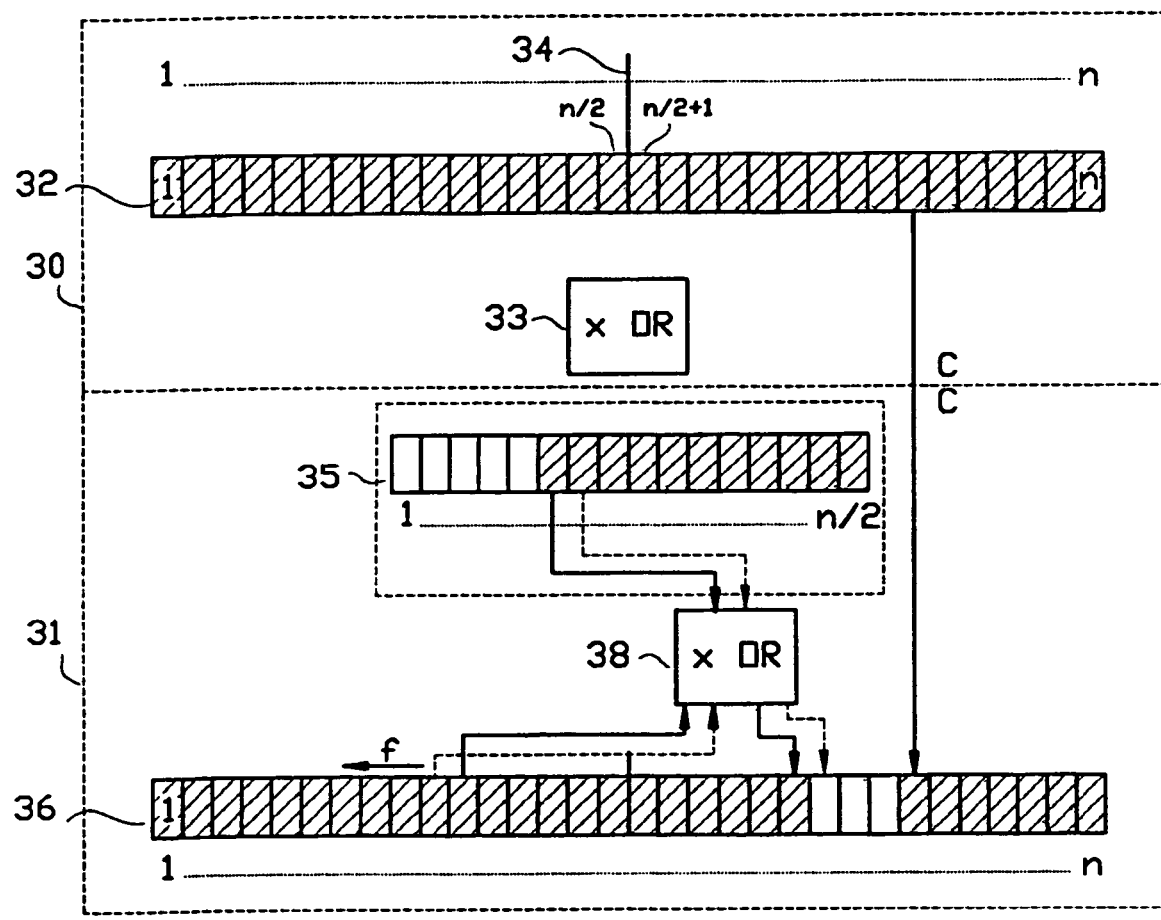

In FIG. 5D the situation is shown wherein almost the entire data packet buffer 36 is filled. In practice the flow C, that still continues here, can already be stopped when flow A has been completely received, in this case n/2 data elements large, and the number of data elements of flow B and C together are equal to the remaining part of the data elements, in this case n/2. Another possibility, when one of the flows A or C is very fast, is to let the fast flow continue beyond the middle, and to stop when the sum of the data elements of the three flows together is n data elements.

Figure 6A:
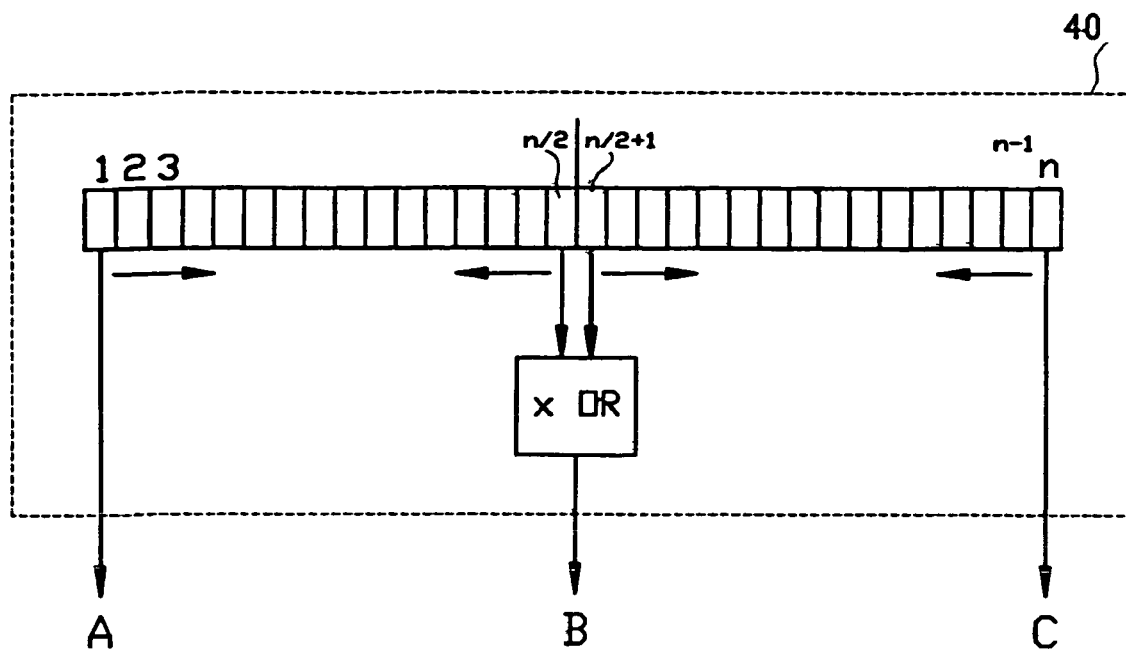
Figure 6A:
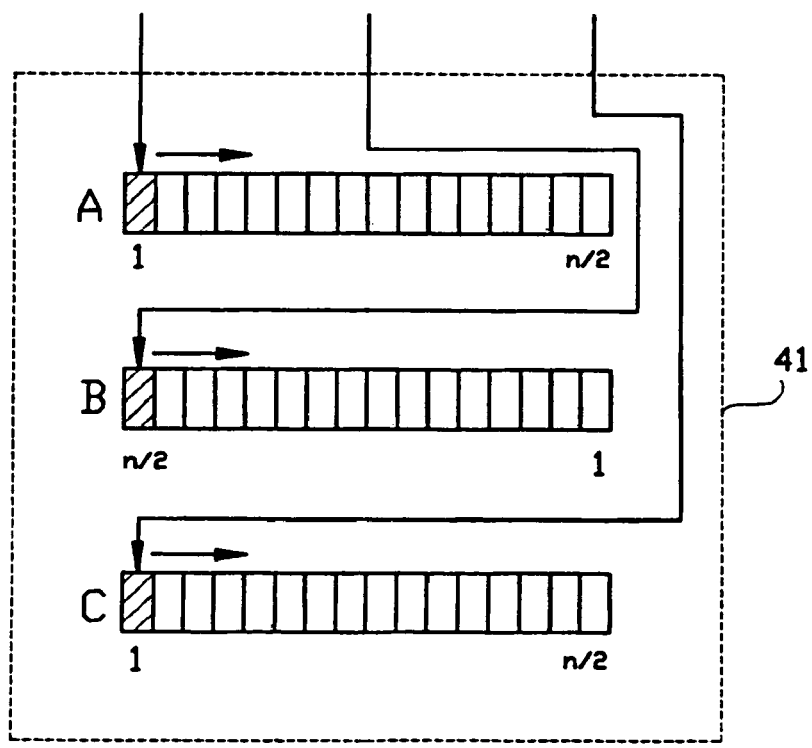

In FIG. 6A the situation is shown wherein at the receiving side 41 use is made of three data buffers A, B and C. From the transmitting side three data flows A, B and C are running, which at the receiving side are put in the data buffers A, B and C, respectively. In this example said receiving buffers are n/2 data elements large. An advantage of making use of three data buffers is that checking is easy. When a buffer is full sending the flow that fills the buffer can be stopped with. Also when a buffer is full, the flow that filled the now full buffer can be diverted and fill another buffer from another side than from where an existing flow already fills it.

Figure 6B:
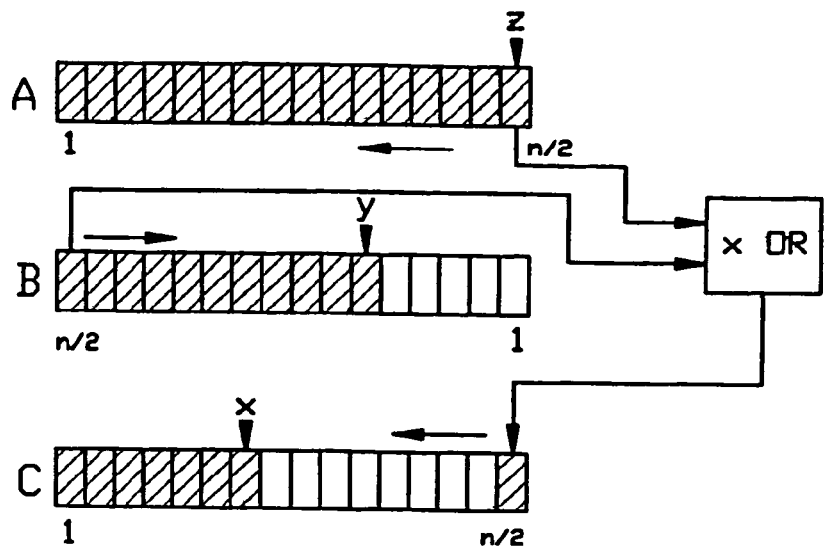

In FIG. 6B it is indicated how reconstruction can take place. In this case data buffer A was full first. Pointer z indicates where the last data elements stands. In the other buffers the position of the last data element is indicated by pointers x and y, respectively. By means of the data that are already present in the data buffer B data buffer C can be filled from rear to front. To that end a data element can be retrieved from the rear of data buffer A and from the front of data buffer B (which can of course also be from the rear when the data buffer B has been filled from the rear). The two data elements are supplied to an XOR operator and converted into a data element that can be placed in data buffer C. In this way data buffer C is in this case filled from two sides. When it appears that the quantity of data in data buffer B and in data buffer C together are sufficient to completely fill data buffer C, the data flows B and C to data buffer C and B, respectively, can stop, as has also been indicated in FIG. 6B. It is also possible, when one buffer A or C is full, to divert the further flow to that buffer to buffer C or A, respectively. This can be stopped when the sum of the data elements together is n.

Figure 6C:
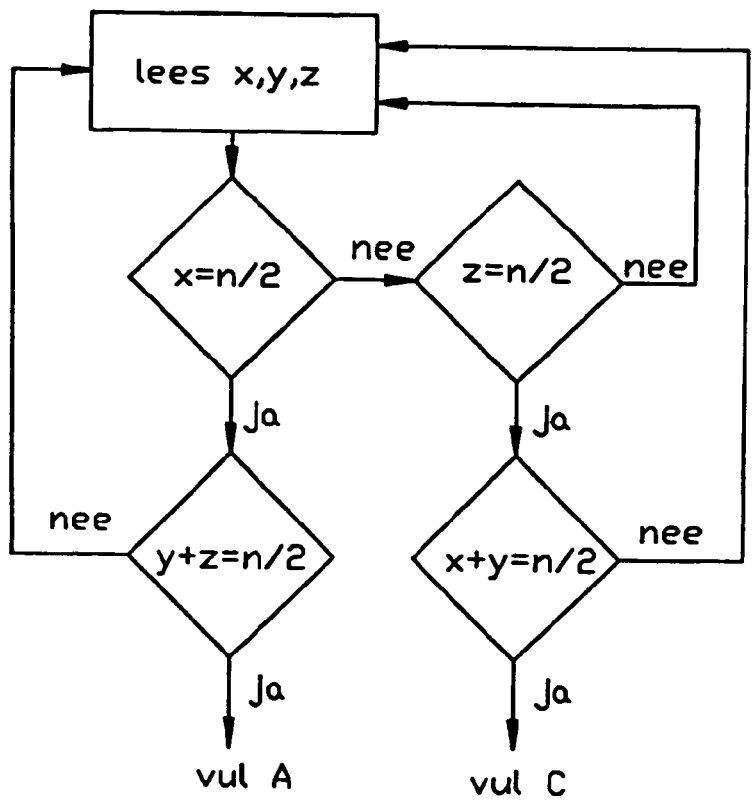

In FIG. 6C a flow chart is shown of a check algorithm for a situation as depicted in FIGS. 6A and 6B for the receiving side to determine whether the transmission of data can already be stopped. In FIG. 6B pointers x, y and z are indicated that tally where the data received have to be placed. On the basis of the algorithm it is determined which data buffer is not full yet, and whether the contents of the other two data buffers is sufficient to completely fill the data buffer A or C that is not completely filled yet.

Figure 7B:
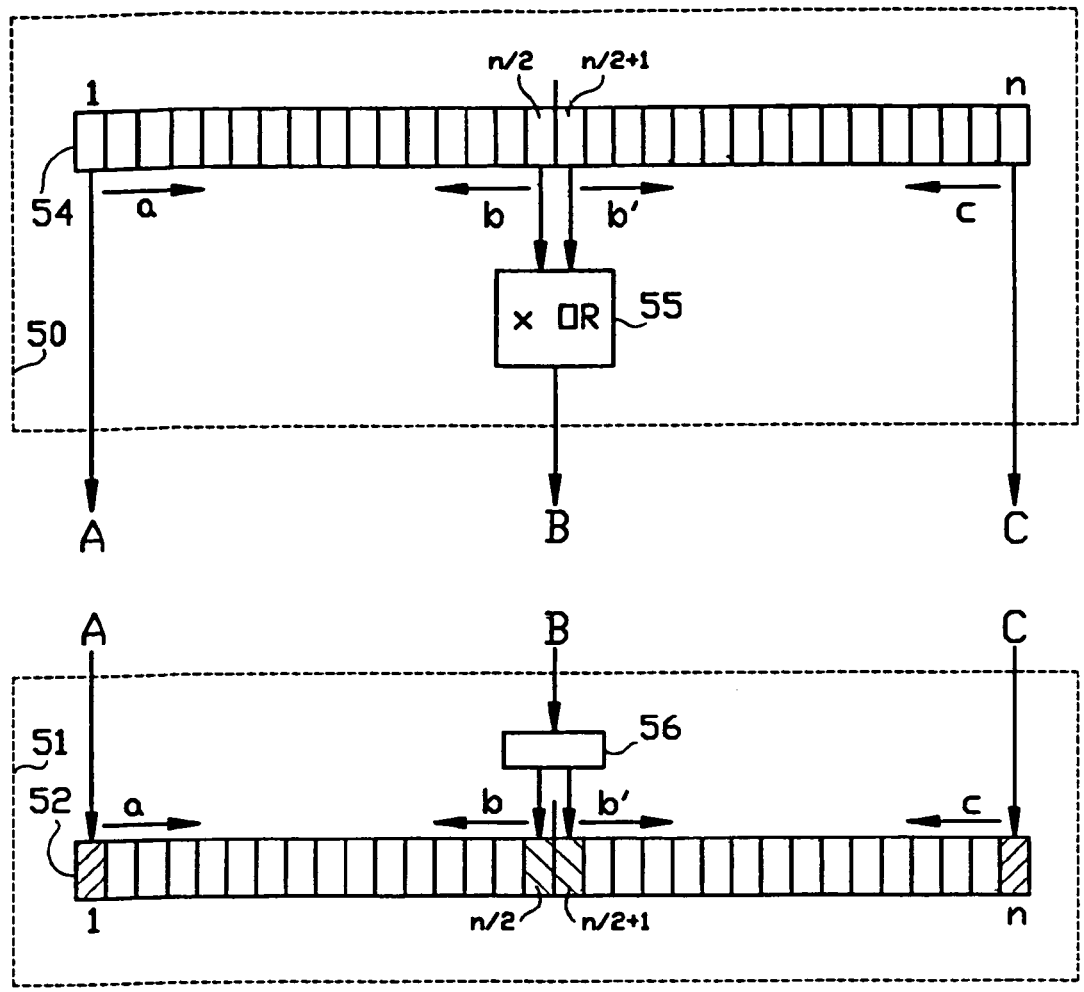
Figure 7B:
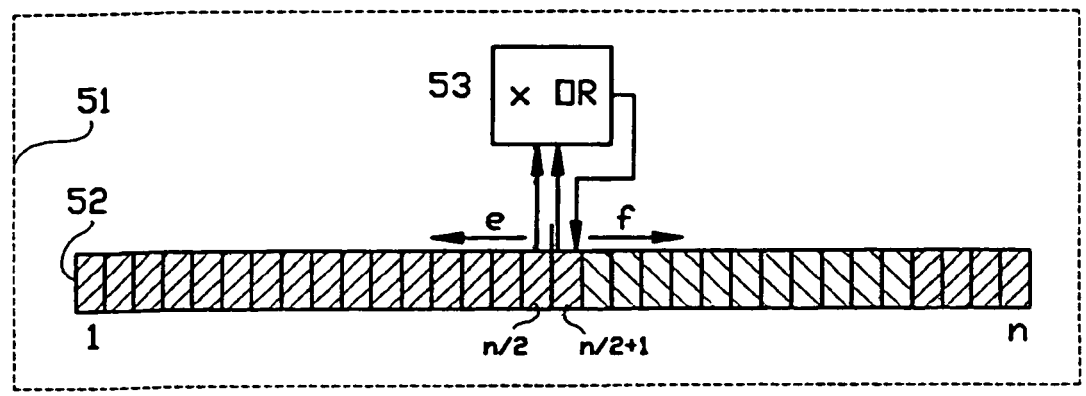

In FIGS. 7A-7B an embodiment is shown wherein at the receiving device 51 use is made of one data buffer 52. The transmitting device 50 is provided with a data buffer 54 and an XOR operator 55, the receiving device 52 is also provided with a data buffer 52 and an XOR operator 53. Additionally the receiving device 51 is provided with a duplicator 56 to place the data of data flow B on two positions in the data buffer 52.

The operation is as follows. Via the data flow A data are sent, wherein the data buffer 54 is read in the direction a. Via the data flow C the data are sent, wherein the data buffer 54 is read in the direction c, and two flows of data that from the middle in the direction b and b' comprise data from the data buffer 54 are led to the XOR operator 55, where each time two data elements are converted into one data element that is sent via data flow B.

In the receiving device 51 data flows enter via receiving means. The data elements of data flow A are put in the data buffer 52 from the front towards the rear in the direction a. The data elements of flow C are put in data buffer 52 from the rear towards the front in the direction c. The data elements of data flow B are duplicated by means of duplicator 56 and put in the data buffer 52 from the middle in the direction b and b'. When the data buffer 52 is full, wherein at least one half (either the front or rear half) is filled with data from data flow A or C, the reconstruction of the other data elements can begin as indicated in FIG. 7B. In principle the data flows can stop then. Two data elements that are symmetrically situated with respect to the middle of the data buffer 52 are read and supplied to an XOR operator. The result is, starting from the middle, entered into the data buffer 52. Subsequently the next data elements in the direction e and f are read and written to the right-hand side of the data buffer. This can be seen by means of the hatched lines.

In various figures each time a transmitting device is shown having three outgoing data flows. In practice however there will generally be three separate transmitting devices that each ensure one of the data flows.

According to the invention it may be so that right at the beginning, at the start of transmission, it appears that one of the three flows is insufficient to contribute to the reception. It can then be decided to continue with two of the three flows. It is possible that this is not geared with the transmitting device. In fact in this boundary case the third flow is present only a little while, and it may therefore occur that the third flow does not contribute to the overall transmission of the data at all.

For that matter the method according to the invention may for instance be used in GSM or other cordless telephony. In that case a conversation or a data flow can be divided into little packets which can be sent in accordance to the method according to the invention. Use can also be made of the available band width: each data flow can be sent over another band, so that optimal use can be made of the available band width. It is also possible to send different flows over different frequencies.

The devices described can be (personal) computers or PDA's that are connected to each other via the internet or an intranet. In those cases the data packet can be a data file or internet page, but also a streaming audio or video broadcast. The device can also be an (intelligent) television which via a data connection downloads a film or the like.

The methods, devices and software as described above can very well be deployed in organic data networks such as extensively described in Dutch patent 1017388. Especially because the devices described in that patent forward data independent from a transmission device, the method described has advantages because no complicated control platform is necessary.

Figure 8:
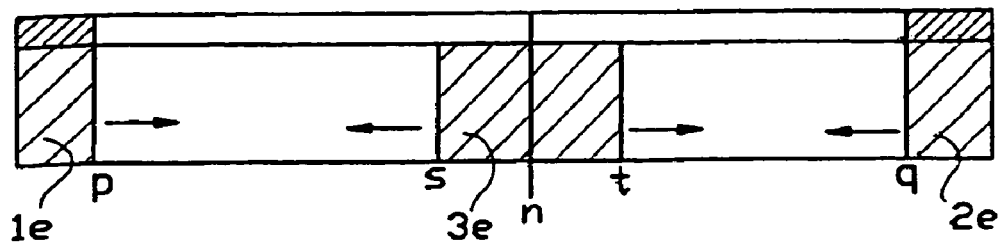
Figure 8:
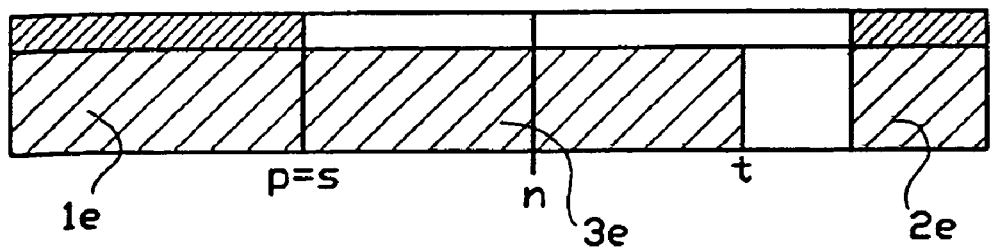
Figure 8:
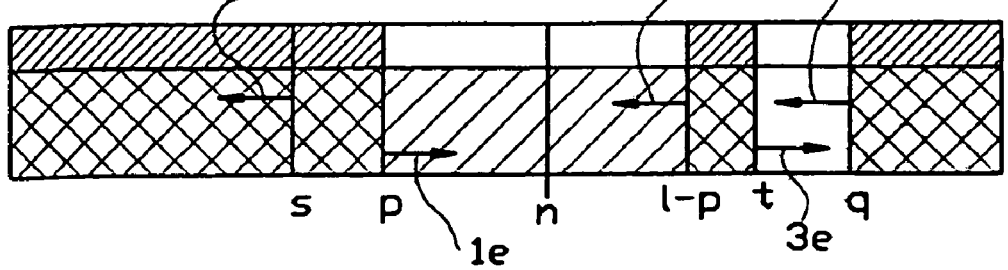

A possible set of decision rules is also shown below. In FIG. 8 the consecutive steps are shown.

Variables:

| | |
|---|---|
| a | true if 1st flow active |
| b | true if 2nd flow active |
| c | true if 3rd flow active |
| p | position 1st flow in the buffer |
| q | position 2nd flow in the buffer |
| s | position 3rd flow in the buffer |
| t | complementary position 3rd flow in the buffer |
| l | length buffer |
| n | length half of the buffer (l/2) |
| D | data buffer |
| R | data element to be written |

Write Action 1st Flow:

```
p = p + 1
D[p] = R
If p = q then stop all        buffer full
If q = n and p = s then stop 1st flow
If c true and p > = s then
    If p = < n then D[l−p] = D [l−q] xor R else stop 1st flow
    If l − p > q then stop 1st and 3rd flow
```

Write Action 2nd Flow:

```
q = q + 1
D[q] = R
If p = q then stop all        buffer full
If p = n and q = t then stop 2nd flow
If c true and t > = q then
    If p > = n then D[l−q] = D [l−q] xor R else stop 2nd flow
    If l − q > p then stop 2nd and 3rd flow
```

Write 3rd Flow

```
s = s − 1
t = t + 1
If p > = s and q > = t then stop 3rd flow        3rd flow ready
If p < s then D[s] = R else D[s] = R xor D[t]
If q < t then D[t] = R else D[t] = R xor D[s]
```

If c is not true xor flow does not run and one should wait until the buffer is full (p=q)

The invention claimed is:

1. A method for transmitting digital data, wherein a packet of digital data elements is split into a front sub-packet and a rear sub-packet, the method comprising:
   sending a first flow of digital data, which is stored in memory, starting from the front end of the front sub-packet;
   sending a second flow of digital data, which is stored in memory, starting from the rear end of the rear sub-packet; and;
   sending a third flow of digital data, which is stored in memory, starting from between the front and rear sub-packets;
   wherein the third flow includes a plurality of third data elements, each third data element obtained by reducing a first data element from the rear part of the front sub-packet and a second data element from the front part of the rear sub-packet into a third data element by using a reversible operation.

2. The method according to claim 1, wherein said packet of digital data comprises data elements 1 through n, said front sub-packet having data elements 1 through m and said rear sub-packet having data elements m+1 through n, said first data elements being consecutively selected for the third flow in the order m, m−1, and further, and said second data elements being consecutively selected for the third flow in the order m+1, m+2, and further.

3. The method according to claim 2, wherein m=n/2.

4. The method according to claim 1, in which the first and second data elements are bits of the packet of digital data, and the reversible operation is a binary operation.

5. The method according to claim 4, wherein given first data elements A, second data elements B, and third data elements C, the reversible operation is an operation F(A,B)=C, such that there exist operations G and H for which G(A,C)=B and H(B,C)=A.

6. The method according to claim 1, wherein the data elements of the first, second and third flows, respectively, are placed in first, second and third data buffers, respectively.

7. The method according to claim 6, wherein each of the data buffers has a size corresponding to a size of one of the sub-packets.

8. The method according to claim 1, wherein the data elements of the first, second and third flows are placed in one data buffer having a size corresponding to a size of the packet of digital data.

9. The method according to claim 8, wherein the first flow fills the data buffer from front to rear, the second flow fills the data buffer from rear to front, and the third flow is duplicated, wherein one duplicated flow fills the data buffer from the middle to the front, and the other duplicated flow fills the data buffer from the middle to the rear.

10. The method according to claim 1, wherein;
the data elements of the first and second flows are placed in a first data buffer, the first flow filling the data buffer from front to rear, and the second flow filling the data buffer from rear to front; and
the data elements of the third flow are placed in a second data buffer.

11. The method according to claim 1, wherein a first, second and third device, respectively, send the first, second and third, flows respectively.

12. The method according to claim 1, wherein the flows are substantially sent simultaneously.

13. The method according to claim 1, wherein a transmitting device sends the first, second, and third flows to first, second and third receiving devices, respectively, and wherein the first, second, and third receiving devices forward their respective flows to each of the other two receiving devices.

14. A method for receiving a packet of digital data, wherein a receiving device is provided with data storage means, the method comprising:
defining a data buffer in the data storage means the size of a packet of digital data to be received, the data buffer having a front, a middle, and a rear;
defining a first flow, a second flow, and a third flow of data elements;
receiving one or more of the first, second, and third flows;
filling the data buffer from front to rear with the first flow of data elements;
filling the data buffer from rear to front with the second flow of data elements; and
filling the data buffer from the middle to the front and to the rear with the third flow of data elements.

15. A method for receiving a packet of digital data of data elements 1 through n, transmitted using the method of claim 1, wherein a receiving device is provided with data storage means, the method comprising:
defining at least a first and second data buffer in the data storage means, the first data buffer having the size of the packet of digital data to be received and the second data buffer having at least half the size of the packet of digital data;
defining a first flow of data elements A, a second flow of data elements B, and a third flow of data elements C;
receiving one or more of the first, second, and third flows;
filling the first data buffer from front to rear with the data elements of the first flow of data elements and rear to front with the data elements of the second flow;
filling the second data buffer with the data elements of the third flow of data elements C; and
determining the amount of data elements in the first, second and third flow each time a data element is received.

16. The method of claim 15, further comprising:
if one of the amounts received via the first or second flows equals n/2, taking subsequent data elements A or B originating from that flow, and subsequent data elements C originating from the third flow, applying an operation G or H for which G(A,C)=B or H(B,C)=A, and filling the first data buffer with the resulting data elements; and
if the amount received via the third flow equals n/2, taking subsequent data elements C originating from that flow, and subsequent data elements A or B originating from the flow with the second largest amount, applying an operation G or H for which G(A,C)=B or H(B,C)=A, and filling the first data buffer with the resulting data elements.

17. A method for receiving a packet of digital data of data elements 1 through n, transmitted using the method of claim 1, wherein a receiving device is provided with data storage means, the method comprising:
defining at least a first, second, and third data buffer in the data storage means, each of the data buffers having at least half the size of the packet of digital data to be received;
defining a first flow of data elements A, a second flow of data elements B, and a third flow of data elements C;
receiving one or more of the first, second, and third flows;
filling the first data buffer with the data elements of the first flow of data elements A;
filling the second data buffer with the data elements of the first flow of data elements B;
filling the third data buffer with the data elements of the third flow of data elements C; and
determining when one of the buffers holds n/2 data elements.

18. The method of claim 17, further comprising:
if the first buffer holds n/2 data elements A, taking subsequent data elements A from that buffer and subsequent data elements C originating from the third buffer, applying operation G for which G(A,C)=B, and filling the second data buffer with resulting data elements B;
if the second buffer holds n/2 data elements B, taking subsequent data elements B from that buffer and subsequent data elements C originating from the third buffer, applying operation H for which H(B,C)=A, and filling the first buffer with resulting data elements A; and
if the third buffer holds n/2 data elements C, taking subsequent data elements C from that buffer and subsequent data elements A or B originating from the buffer holding the second largest amount of data elements, applying an operation G or H for which G(A,C)=B or H(B,C)=A, and filling the other data buffer with the resulting data elements.

19. A device for sending a packet of digital data consisting of data elements, the packet having a front sub-packet and a rear sub-packet, the device comprising:
a transmission module, adapted for transmitting the data elements;
a memory module, adapted for storage of the packet of digital data;
a reading module, adapted for reading two data elements from two parts of the memory module, one data element A being from the rear part of the front sub-packet, and one data element B being from the front part of the rear sub-packet;

an operator, adapted for converting said two data elements, A and B, into a third data element C to be transmitted, said operator performing a reversible operation; and a construction module, adapted for receiving the data elements A and B from the reading module, supplying the data elements A and B to the operator, receiving the resulting data element C from the operator, and supplying the data element C to the transmission module.

20. The device of claim 19, wherein said data elements are bits;
wherein the reversible operation is an operation F(A,B)=C, such that there exist operations G and H for which G(A, C)=B and H(B,C)=A.

21. A device for receiving a packet of digital data consisting of data elements, the device comprising:
a receiving module, adapted for receiving at least three flows of data elements;
a memory module, adapted for storage of the data elements;
an operator, adapted for converting two data elements A and B into one data element C, said operator performing a reversible operation;
a counting module, adapted for tallying the quantity of data elements that have been received from each flow;
a decision module, adapted for determining whether all data elements that are necessary for reconstructing the complete packet of digital data are present and for determining which part of the packet has to be determined by reconstruction; and
a reconstruction module for retrieving two data elements A and B from the memory, one of the data elements A and B originating from one of the flows and the other of the data elements A and B originating from one of the other flows, the reconstruction module being connected to the operator for supplying said data elements A and B to the operator, discharging the resulting data element C of the operator, and writing the resulting data element C to the memory module.

22. The device of claim 21, wherein said data elements are bits, and said operations F, G, and H are XOR operations.

23. The device according to claim 21, further comprising a duplicating module, adapted for duplicating a data element and writing each of the duplicated data elements to the memory module.

24. A machine-readable medium containing instructions which, when executed by a machine, cause the machine to perform operations comprising:
splitting a packet of digital data elements stored in a memory into a front sub-packet and a rear sub-packet;
forming at least three flows:
a first flow of digital data starting from the front of the front sub-packet;
a second flow of digital data is staring from the rear of the rear sub-packet, and;
a third flow of digital data starting from between the front and rear sub-packets; wherein the third flow includes a plurality of third data elements, each third data element obtained by reducing a first data element from the rear part of the front sub-packet and a second data element from the front part of the rear sub-packet into a third data element by using a reversible operation;
sending from a transmitting device the first, second and third flows to first, second and third receiving devices, respectively, wherein the first, second and third receiving devices forward their respective flows to each of the other two receiving devices;
and receiving and processing an instruction from a receiver of a flow of data elements to stop transmitting.

25. The machine-readable medium of claim 24, further containing instructions which, when executed by a machine, cause the machine to perform operations including:
receiving an instruction as to which of the flows of data elements has to be sent.

26. The machine-readable medium of claim 24, wherein said data elements are bits, and the reversible operation is an XOR operation.

27. A machine-readable medium containing instructions which, when executed by a machine, cause the machine to perform operations comprising;
receiving a packet of digital data that is sent using one or more flows of data elements;
writing the data elements of each of the flows of data elements to a, memory;
tallying the quantity of data elements that have been received from each flow;
determining whether all data elements that are necessary for reconstructing the complete packet of digital data are present and determining which part of the packet has to be determined by reconstruction;
retrieving two data elements from the memory if it is determined that all data elements necessary for reconstruction are present; supplying the two data elements to a reversible operation;
converting the two data elements into one data element by using the reversible operation; and writing the resulting data element to the memory.

28. The machine-readable medium of claim 27, further containing instructions which, when executed by a machine, cause the machine to perform operations including:
transmitting a message to a source of one of the flows of data elements for stopping said flow.

29. The machine-readable medium of claim 28, wherein said data elements are bits, and the reversible operation is an XOR operation.

* * * * *

UNITED STATES PATENT AND TRADEMARK OFFICE
CERTIFICATE OF CORRECTION

PATENT NO. : 7,529,190 B2  Page 1 of 1
APPLICATION NO. : 10/837546
DATED : May 5, 2009
INVENTOR(S) : Marc van Oldenborgh et al.

It is certified that error appears in the above-identified patent and that said Letters Patent is hereby corrected as shown below:

In claim 24, column 16, line 1, "is staring" should read --starting--.

Signed and Sealed this

Twenty-seventh Day of October, 2009

David J. Kappos
*Director of the United States Patent and Trademark Office*